United States Patent [19]
Witte

[11] Patent Number: 5,465,225
[45] Date of Patent: Nov. 7, 1995

[54] METHOD OF INCREASING THE DATA-PROCESSING SPEED OF A SIGNAL PROCESSOR

[75] Inventor: Franz-Otto Witte, Emmendingen, Germany

[73] Assignee: Deutsche ITT Industries GmbH, Freiburg, Germany

[21] Appl. No.: 185,626

[22] Filed: Jan. 24, 1994

[30] Foreign Application Priority Data

Feb. 12, 1993 [DE] Germany .................. 43 04 198.1

[51] Int. Cl.$^6$ .................................................. G06F 7/38
[52] U.S. Cl. .................................................. 364/736
[58] Field of Search .................................... 364/736

[56] References Cited

U.S. PATENT DOCUMENTS

| | | | |
|---|---|---|---|
| 4,543,641 | 9/1985 | Fukuta et al. | 364/756 |
| 4,592,005 | 5/1986 | Kregness | 364/736 |
| 4,771,379 | 9/1988 | Ando et al. | 364/736 |
| 5,179,531 | 1/1993 | Yamaki | 364/756 |
| 5,327,543 | 7/1994 | Miura et al. | 364/756 |

FOREIGN PATENT DOCUMENTS

| | | |
|---|---|---|
| 1524177 | 3/1970 | Germany . |
| 2233164 | 7/1972 | Germany . |
| 3302885 | 8/1983 | Germany . |
| 3636106 | 4/1987 | Germany . |
| 60167030 | 2/1984 | Japan . |
| 4188320 | 11/1990 | Japan . |

OTHER PUBLICATIONS

Rolf Gluth, "Integrierte Signalprozessoren," *Electronik*, vol. 35, No. 18, Sept. 1986, pp. 112–125.

Philips Journal of Research; Book 42, No. 4, Nov. 23, 1987; "On Rotators and Shifters"; by C. Ronse; pp. 451–479.

*Primary Examiner*—Tan V. Mai
*Attorney, Agent, or Firm*—Thomas L. Peterson

[57] ABSTRACT

An apparatus and method increase the data-processing speed of a signal processor whose signal-processing unit includes at least one arithmetic logic unit and one multiplier which are fed with input data of n-bit word length. When such a signal processor is supplied from a source with input-data words having a shorter word length than the maximum word length of n bits of the signal processor, invalid bits are masked during the loading process. The loading operation is accelerated by changing the contents of the input-data words using a mask value in at least one presettable masking unit before the input-data word is processed by the signal-processing unit.

20 Claims, 2 Drawing Sheets

METHOD OF INCREASING THE DATA-PROCESSING SPEED OF A SIGNAL PROCESSOR

BACKGROUND OF THE INVENTION

1. Field of the Invention

The present invention relates to a method of increasing the data-processing speed of a signal processor whose signal-processing unit, comprising at least one arithmetic logic unit and one multiplier, is fed with input data of n-bit word length.

2. Description of the Related Art

In "Electronik Zeitschrift", Vol. 35 (1986), September, No. 18, pages 112 to 125, the structure of signal processors is shown. Their signal-processing units comprises at least one arithmetic logic unit (ALU) and one multiplier. For different internal and external data bus systems and internal connections between the arithmetic logic unit and the multiplier, the article shows the input-data paths. The input-data paths are the paths to be traversed by the input data from their sources—internal or external memory devices such as read-only memories (ROMs) or random-access memories (RAMS)—to the inputs of the arithmetic logic unit (ALU) and/or the multiplier (MUL).

If such signal processors are supplied from a source with input-data words having a shorter word length than the maximum word length of n bits of the signal processor, the invalid bits must be masked during the loading process. This operation, just as bit manipulations with other maskings, can only be performed in the arithmetic logic unit of such a signal processor in a relatively time-consuming manner. Particularly, if input-data words for the multiplier are to be processed in this way, these input data must first be loaded into the arithmetic logic unit, then processed there, and then transferred to the input of the multiplier.

It is the object of the present invention to provide a method and apparatus whereby the data-processing speed of a signal processor is increased for such applications.

SUMMARY OF THE INVENTION

In accordance with the present invention, before being processed by the signal-processing unit, the contents of the input-data words can be changed by at least one presettable masking unit in accordance with the setting of the masking unit.

With this masking of the input-data words, which can be performed before the signal-processing unit proper, all input-data words fed to the signal-processing unit can be masked independently of the arithmetic logic unit. The number of masking units required to carry out this method is dependent on the number of input-data paths and/or on the data bus structure used by the signal processor, and is at least so large that between every multiplier and ALU input capable of being fed directly with input-data words from a ROM, RAM or I/O area and these input-data sources, such a masking unit is present. Where a masking unit is placed in the input-data path during implementation and whether a masking unit is contained in several input-data paths are dependent on the structure of the signal processor, the implementation cost, and the turnaround-time conditions.

By using this preceding masking unit, which is independent of the arithmetic logic unit, a considerable speed increase is achieved, particularly for input-data words for the multiplier, because the need for the above-described path to the masking via the arithmetic logic unit is completely eliminated. The arithmetic logic unit itself is also relieved of such masking operations, thus reducing the program execution time.

The masking unit can preferably be preset to any one of the following operations:

a) set the contents to logic 1, b) set the contents to logic 0 c) invert or negate the contents, and d) leave contents unchanged.

These operations may be presettable for the contents of the whole input-data word, for given parts, or for each individual bit of the input-data word. Preferably, the present invention provides for independent presetting of the operation of the masking unit for each bit of the input-data word, which permits considerably more flexible use of the masking unit if the implementation level is slightly increased.

In a preferred embodiment of the invention, the presetting of the masking unit is effected by two registers having the same word length as the input-data word, with the desired operation of the masking unit for the respective bit of the input-data word being determined by the contents of those bits of the registers which correspond to the input-data word. The above-specified four possible operations can be selected by the four possibilities of the respective two corresponding bits of the registers. By assigning each of the necessary two bits to one corresponding bit in two registers, a simple assignment for the presetting is achieved.

Preferably, the change of the input-data words in the masking unit is effected without temporary storage of the input-data words, is implemented with as fast a logic circuit as possible, and is placed in the input-data path so that the access times to input-data words for the signal-processing unit are minimized and so that no additional clock cycles are necessary.

For the program execution or evaluation of the contents of the input-data word, it may be advantageous to provide a check on the signs of the input-data words which is independent of the arithmetic logic unit. Therefore, in another preferred embodiment of the method according to the invention, the sign is derived from the contents of the most significant bit in the masking unit and stored in a flag register.

In addition to the masking, a shift operation may be performed which, like any masking of the input-data word, can contribute to the "correct" positioning of the input-data word for the processing by the signal-processing unit.

BRIEF DESCRIPTION OF THE DRAWINGS

One embodiment of the invention will now be explained in more detail with reference to the accompanying drawings, in which.

DETAILED DESCRIPTION OF THE PREFERRED EMBODIMENTS

Figure 1:
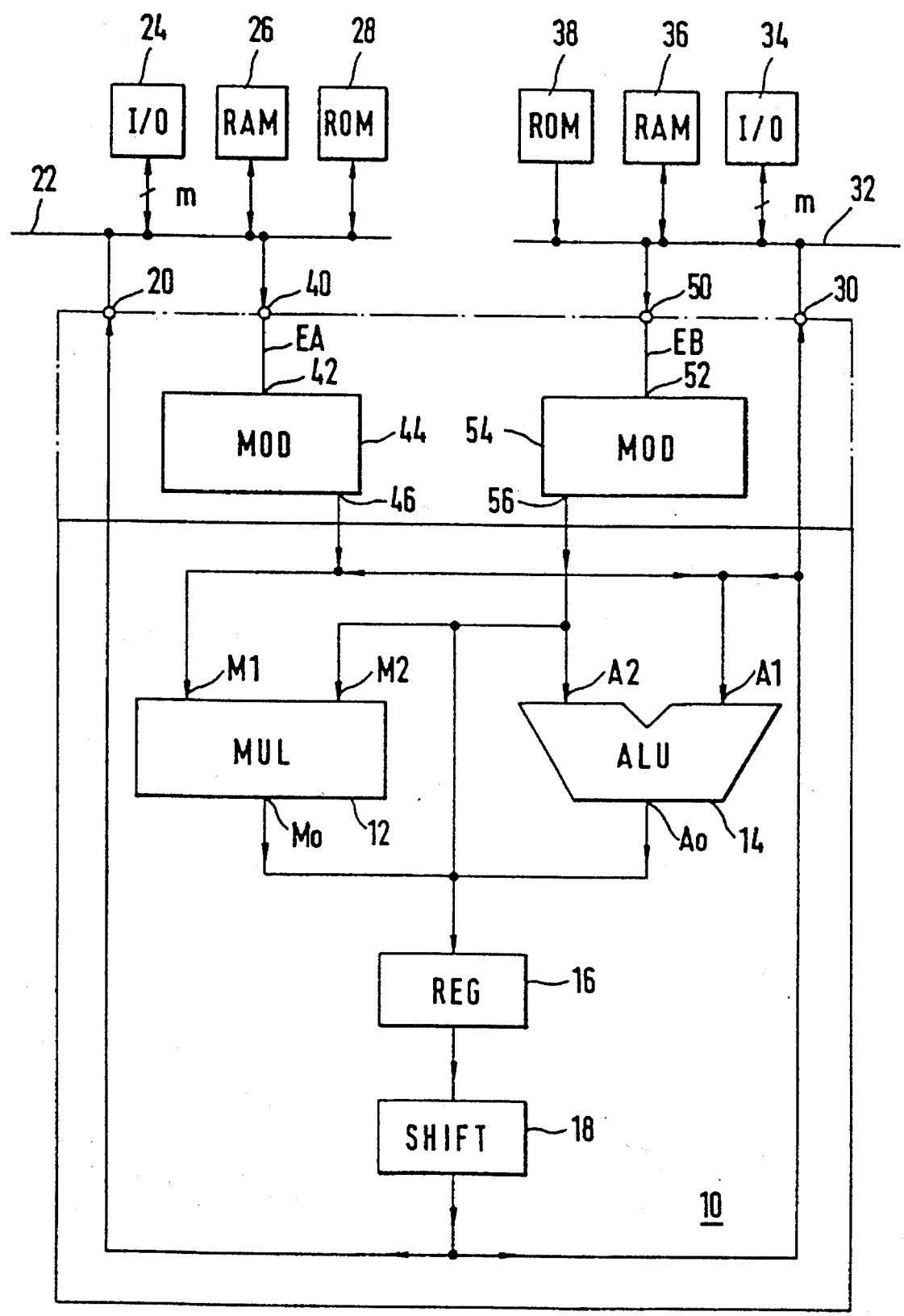
FIG. 1 is a block diagram of a signal processor with the masking units according to the invention.

FIG. 1 shows a greatly simplified block diagram of a signal processor with a signal-processing unit 10. The signal-processing unit 10 comprises: a multiplier 12, an arithmetic logic unit (ALU) 14, a register unit 16 and a shift register 18. The multiplier 12 has data inputs M1 and M2 and a data output Mo. The arithmetic logic unit 14 has data inputs A1 and A2 and a data output Ao. The register unit 16, has a data input connected to the data outputs Mo and Ao of the multiplier 12 and the arithmetic logic unit 14, respectively. The register unit 16 can temporarily store one or more results produced by the multiplier 12 or the arithmetic logic unit 14. The shift register 18 has a data input connected to the data output of the register unit 16.

Unless otherwise indicated, the connection between the individual elements is provided by an n-bit data bus, which, in the preferred embodiment is a 16-bit data bus, and the terms "data input" and "data output" each stand for a corresponding number of connections to the data bus. The direction of a signal flow on a data-bus section is indicated by arrows.

To simplify the representation, the clock supply, the control connections, and the addressing of the individual elements of the signal processor are not shown.

The data output of the shift register 18 is connected via two output terminals 20 and 30 to two independent data-bus systems 22 and 32, respectively. Input-output areas 24 and 34, random-access memories 26 and 36, and read-only memories 28 and 38, respectively, are connected to the data bus systems 22 and 32, respectively. The read-only memories 28, 38 may hold, for example, constant coefficients for filter computation if the signal processor processes such a program for a digital filter. The intermediate and/or final results of such a program for digital filter computation may be stored in the random-access memories. Digitized input-data sequences may be fed to the signal processor or delivered by the signal processor to peripheral units such as digital-to-analog converters via the input-output area. The two independent data-bus systems may be either located outside the signal processor or implemented, at least in part, within the signal processor, with certain memory parts (e.g., the read-only memories 26, 36) lying either exclusively within the signal processor or both within and outside the signal processor (e.g., subareas of the random-access memories 26, 36 for intermediate results or loadable constants within the signal processor, and parts of the random-access memories 26, 36 for final results outside the signal processor).

In this embodiment, the two input-output areas 24 and 34 are connected to the data buses 22 and 32, respectively, via only m-bit (e.g., 8-bit) wide data-bus sections. Thus, input-data words which are to be transferred from these input-output areas 24, 34 to the signal-processing unit 10 must always be masked.

The signal processor 10 is connected to the two independent data-bus systems 22 and 32 via input terminals 40 and 50, respectively. Input-data words EA and EB from the input terminals 40 and 50 are applied to the inputs 42 and 52 of identically constructed masking units (MOD) 44 and 54, respectively. The output 46 of the masking unit 44 is coupled to the input M1 of the multiplier 12 and to the input A1 of the arithmetic logic unit 14. The output 56 of the masking unit 54 is coupled to the input M2 of the multiplier 12 and to the input A2 of the arithmetic logic unit 14.

In this arrangement, input-data words EA and EB which are to be transferred from the read-only memories 28 and 38, the random-access memories 26 and 36 or the input-output areas 24 and 34, respectively, to the multiplier 12 or the arithmetic logic unit 14 pass through the masking units 44 and 54, respectively, which are independent of the arithmetic logic unit 14. The input-data words EA and EB can be changed in the masking units 44 and 54 in accordance with the respective settings of the masking units 44 and 54. For input-data words EA and EB from the input-output areas 24 and 34, respectively, fixed values may be preset in the masking units 44 and 54 for those 8 of 16 bits which are not controlled with defined values from the 8-bit data-bus sections associated with the input-output areas 24 and 34, respectively.

In this embodiment, the masking units 44 and 54 are so positioned in the input-data paths that each of them is used by a group of input-data paths connected to a data-bus system.

Internal feedback loops of the signal-processing unit 10 are provided in this embodiment from the output of the shift register 18 to the inputs M1 and A1 of the multiplier 12 and the arithmetic logic unit 14, respectively, and from the outputs Mo and Ao to the inputs M2 and A2 of the multiplier 12 and the arithmetic logic unit 14, respectively. The internal feedback loops do not pass through the masking units 44 and 54. Thus, additional delays in such feedback loops can be avoided, since it can be assumed that the output data of the multiplier 12 and the arithmetic logic unit 14 are valid in their full word width and that any masking of such data that may be necessary can be performed by the arithmetic logic unit 14 itself.

Figure 2:
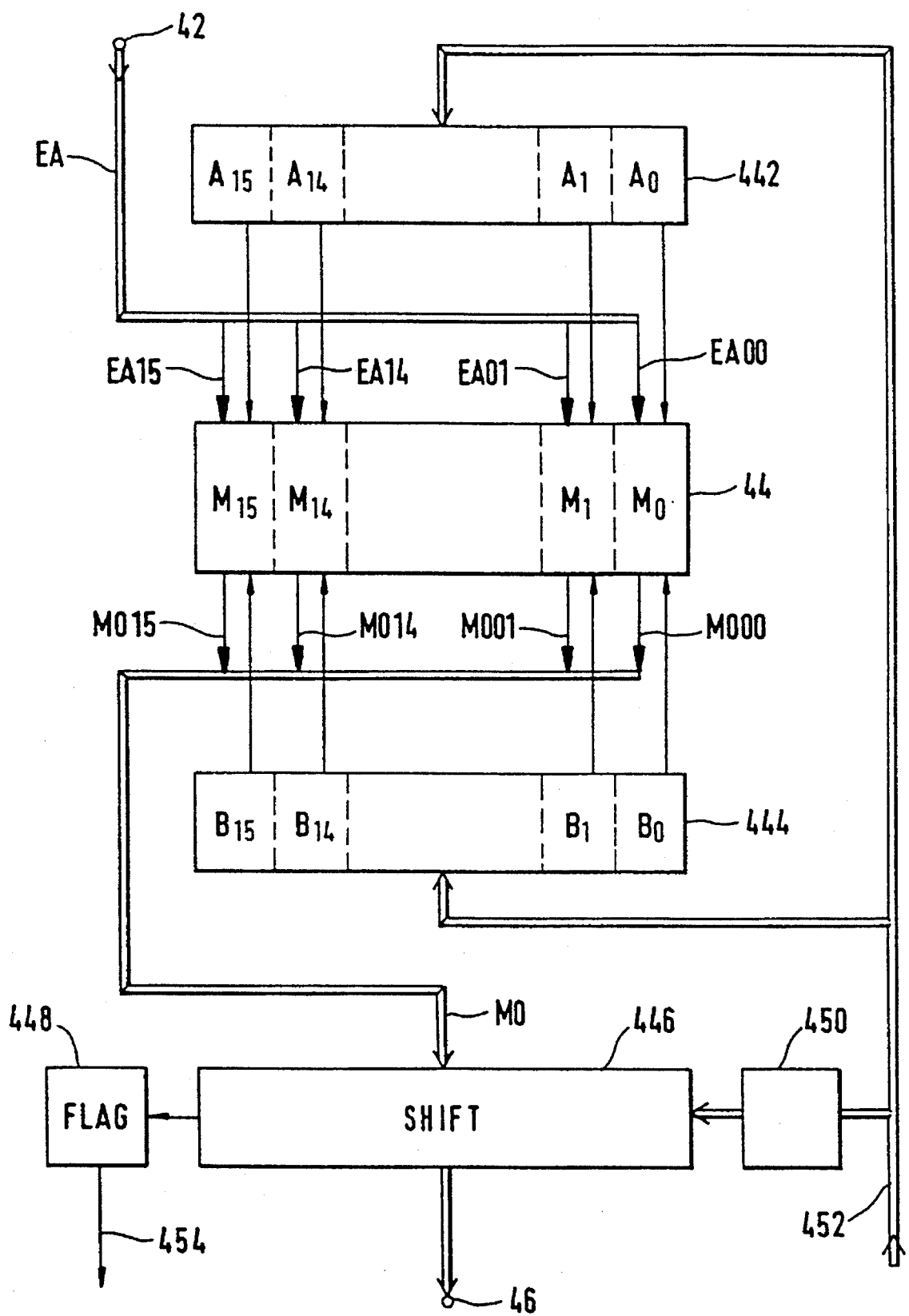
FIG. 2 is a block diagram of a masking unit with the registers for presetting this unit.

The construction of a masking unit 44 is shown in FIG. 2 in block diagram form.

The input-data words EA are transferred to a masking unit 44 via the input terminal 42. The masking unit 44 comprises n (e.g., 16) masking subunits $M_0$–$M_{15}$ of identical construction. The data input of each of the masking subunits is supplied with one bit (EA00 to EA15) of the input-data words EA. The first control inputs of these subunits are controlled by the n (i.e., 16) control outputs of a first register 442 with memory locations $A_0$ to $A_{15}$.

The second control inputs of the masking unit 44 are controlled by the n (i.e., 16) control outputs of a second register 444 with memory locations $B_0$ to $B_{15}$. Both registers 442 and 444 can be loaded with predetermined values from the instruction decoder of the signal processor via a data bus 452 (not shown in FIG. 1). The desired operation of the masking unit 44 is determined by the contents of those bits of the registers which correspond to the input-data word EA. In the masking subunit $M_{15}$, for example, bit 15 of the input-data word EA (i.e., EA15) is changed in accordance with the contents of memory location $A_{15}$ of the register 442 and of memory location $B_{15}$ of the register 444 as follows:

| $A_{15}$ | $B_{15}$ | MO15 |
| --- | --- | --- |
| 0 | 0 | MO15 = "0" |
| 0 | 1 | MO15 = $\overline{EA15}$ |
| 1 | 0 | MO15 = "1" |
| 1 | 1 | MO15 = EA15, | where MO15 stands for the output signal of the masking subunit M15.

The output signals MO00 to MO15 of the masking subunits $M_0$ to $M_{15}$ are passed through an additional shift register 446 before being transferred via the output terminal 46 to the signal-processing unit 10 (FIG. 1). In the shift register 446, the sign of the data word is derived from the content of the most significant bit and passed on to a flag register 448 for storage. The shift register 446 is controlled via a register 450, which can be loaded with predetermined values via the data bus 452.

What is claimed is:

1. A method of increasing the data-processing speed of a signal processor having a signal-processing unit comprising at least one arithmetic logic unit and one multiplier, said method comprising the steps of:

providing said signal-processing unit with first and second input-data words, each input-data word having an n-bit word length, each input-data word being selectably provided as an input to said arithmetic logic unit and as an input to said multiplier;

presetting a masking unit, which operates independently of said multiplier and said arithmetic logic unit, with a selectable presettable mask value, said presettable mask value being selectable for each bit in one of said n-bit input-data words; and changing the contents of at least one of said first and second input-data words in accordance with said selectable presettable mask value before providing said at least one of said first and second input-data words to said signal-processing unit.

2. The method as defined in claim 1, wherein said presettable value of said masking unit is presettable to perform a selected one of the following operations on said one of said first and second input-data words:

a) set the contents to logic 1, b) set the contents to logic 0, c) invert or negate the contents, and d) leave contents unchanged.

3. The method as defined in claim 2, wherein said presettable value of said masking unit is presettable independently for each bit of said one of said first and second input-data words.

4. The method as defined in claim 3, wherein said step of presetting said masking unit is effected by the contents of first and second registers, each having the same word length n as said one of said first and second input-data words, and wherein a desired operation of said masking unit is determined by the contents of bits of said first and second registers which correspond to bits in said one of said first and second input-data words.

5. The method as defined in claim 4, wherein said change of said one of said first and second input-data words in said masking unit is effected without temporary storage of said one of said first and second input-data words.

6. The method as defined in claim 5, further including the steps of:

deriving a sign bit from the content of the most significant bit of said one of said first and second input-data words; and storing said sign bit.

7. The method as defined in claim 6, further including the step of performing a shift operation on said one of said first and second input-data words.

8. The method as defined in claim 1, wherein said presettable value of said masking unit is presettable independently for each bit of said one of said first and second input-data words.

9. The method as defined in claim 8, wherein said step of presetting said masking unit is effected by the contents of first and second registers, each having the same word length n as said one of said first and second input-data words, and wherein a desired operation of said masking unit is determined by the contents of bits of said first and second registers which correspond to bits in said one of said first and second input-data words.

10. A circuit arrangement for increasing the data-processing speed of a signal processor having a signal-processing unit that comprises at least one arithmetic logic unit and one multiplier, said signal processing unit being fed with first and second input-data words of n-bit word length, each input-data word being selectably provided as an input to said arithmetic logic unit and as an input to said multiplier, said circuit arrangement comprising at least one presettable masking unit which operates independently of said multiplier and said arithmetic logic unit and which selectively changes the data of at least one of said first and second input-data words in accordance with a selectable presettable mask value, said presettable mask value being selectable for each bit in said at least one of said n-bit input-data words, said data changed by said presettable mask value before said at least one of said first and second input-data words is provided as an input to said signal-processing unit.

11. The circuit arrangement as defined in claim 10, wherein said masking unit is presettable to perform a selected one of the following operations on said one of said first and second input-data words:

e) set the contents to logic 1, f) set the contents to logic 0, g) invert or negate the contents, and h) leave contents unchanged.

12. The circuit arrangement as defined in claim 11, wherein said masking unit is presettable independently for each bit of said one of said first and second input-data words.

13. The circuit arrangement as defined in claim 12, further comprising first and second registers having said n-bit word length, wherein said selectable operation of said masking unit is determined by the contents of bits of said first and second registers which correspond to bits of said one of said first and second input-data words.

14. The circuit arrangement as defined in claim 13, wherein said change of said one of said first and second input-data words in said masking unit is effected by a logic circuit without temporary storage of said one of said first and second input-data words.

15. The circuit arrangement as defined in claim 14, wherein a sign bit is derived from the content of the most significant bit of said one of said first and second input-data words, and wherein said sign bit is stored in a flag register.

16. The circuit arrangement as defined in claim 15, further comprising a shift register that performs shift operations.

17. The circuit arrangement as defined in claim 16, further comprising a masking unit for each input-data path of said signal processing unit.

18. The circuit arrangement as defined in claim 10, wherein said masking unit is presettable independently for each bit of said one of said first and second input-data words.

19. The circuit arrangement as defined in claim 18, further comprising first and second registers having said n-bit word length, wherein said selectable operation of said masking unit is determined by the contents of bits of said first and second registers which correspond to bits of said one of said first and second input-data words.

20. The circuit arrangement as defined in claim 10, further comprising a masking unit for each input-data path of said signal processing unit.

* * * * *